United States Patent [19]
Ishiwata et al.

[11] Patent Number: 5,938,941
[45] Date of Patent: Aug. 17, 1999

[54] MAGNETORESISTANCE EFFECT COMPOSITE HEAD AND METHOD OF FORMING THE SAME

[75] Inventors: Nobuyuki Ishiwata; Tsutomu Ishi; Kiyokazu Nagahara; Kazumasa Kumagai, all of Tokyo, Japan

[73] Assignee: NEC Corporation, Tokyo, Japan

[21] Appl. No.: 09/116,570

[22] Filed: Jul. 16, 1998

Related U.S. Application Data

[62] Division of application No. 08/944,439, Oct. 6, 1997.

[30] Foreign Application Priority Data

Oct. 4, 1996 [JP] Japan ..................................... 8-264232

[51] Int. Cl.$^6$ ....................................................... G11B 5/00
[52] U.S. Cl. .................................. 216/22; 216/67; 216/79
[58] Field of Search ................................. 216/22, 66, 67, 216/79

[56] References Cited

U.S. PATENT DOCUMENTS

| | | | |
|---|---|---|---|
| 4,436,593 | 3/1984 | Osborne et al. ........................... | 216/22 |
| 4,470,873 | 9/1984 | Nakamura ................................. | 156/640 |
| 4,702,794 | 10/1987 | Nakamura et al. ........................ | 216/22 |
| 4,791,719 | 12/1988 | Kobayashi et al. ........................ | 29/603 |
| 4,992,901 | 2/1991 | Keel et al. ................................. | 360/110 |
| 5,438,747 | 8/1995 | Krounbi et al. ..................... | 29/603.16 |
| 5,649,351 | 7/1997 | Cole et al. ................................. | 216/22 |
| 5,695,656 | 12/1997 | Park et al. ................................. | 216/22 |

OTHER PUBLICATIONS

R.P. Hunt, "A Magnetoresistive Readout Transducer", pp. 150–154, IEEE Transactions on Magnetics, vol. 7, No. 1, Mar. 1971.

*Primary Examiner*—Richard Bueker
*Attorney, Agent, or Firm*—Young & Thompson

[57] ABSTRACT

An inductive head structure provided in a magnetoresistance effect composite head includes an inductive head and a magnetoresistance effect head, the inductive head structure including a magnetic gap layer sandwiched by first and second magnetic layers acting as magnetic poles, the first magnetic layer being positioned close to the magnetoresistance effect head, the magnetic gap layer being made of a non-magnetic and electrically insulative material, wherein the non-magnetic and electrically insulative material has a higher etching rate to reactive ion etching than at least a magnetic material of the second magnetic layer.

15 Claims, 6 Drawing Sheets

MAGNETORESISTANCE EFFECT COMPOSITE HEAD AND METHOD OF FORMING THE SAME

CROSS-REFERENCE TO RELATED APPLICATIONS

This application is a division of copending application Ser. No. 08/944,439, filed Oct. 6, 1997.

BACKGROUND OF THE INVENTION

The present invention relates to a magnetoresistance effect composite head and a method of forming the same.

The magnetoresistance effect composite head comprises a magnetoresistance effect head for reproduction in combination with an inductive head for recording. As the magnetic recording medium has been scaled down and has increased in capacity, a relative speed between the readout magnetic head and the magnetic recording medium is reduced, for which reason the magnetoresistance effect head has become attractive because of independence of reproduction output from the relative speed. The magnetoresistance effect head is disclosed in IEEE Transaction on Magn. MAG7, 1970, 150 entitled "A Magnetoresistivity Readout Transducer".

The most useful magnetoresistance effect head is the magnetoresistance effect composite head which comprises a magnetoresistance effect head for reproduction in combination with an inductive head for recording. The magnetoresistance effect head comprises a magnetoresistance effect element sandwiched through magnetic isolation layers made of an insulator by a pair of first and second magnetic shielding films S1 and S2. The inductive head comprises a coil sandwiched through insulators by first and second magnetic poles P1 and P2 and a magnetic gap provided between the first and second magnetic poles P1 and P2, wherein the first magnetic pole P1 comprises the second magnetic shielding film The magnetoresistance effect composite head has a serious problem in that a large side fringe magnetic field 13 generated when recording. The side fringe magnetic field is caused by leakage of magnetic flux due to a difference in size or width between the first and second magnetic poles P1 and P2. This side fringe magnetic field prevents minimization in width of the tracks. This means that the side fringe magnetic field limits the maximum density of the track. In order to increase the density recording, it is required to reduce the side fringe magnetic field.

The conventional inductive head to be used for recording and reproduction is so formed that, of the first and second magnetic poles, side faces defining the track width are the same on air bearing surfaces facing to the magnetic recording medium, so as to reduce the side fringe magnetic field.

By contrast, in the magnetoresistance effect composite head, the width of the second magnetic pole P2 defines the track width whilst the first magnetic pole P2 is required to be wide for shielding the magnetoresistance effect element, for which reason the first magnetic pole P1 is much wider than the second magnetic pole P2. This large difference in width of the first and second magnetic poles P1 and P2 causes the side fringe magnetic field extending in lateral direction beyond the width of the second magnetic pole P2.

In the Japanese laid-open patent publication No. 7-262519, it is disclosed to reduce the side fringe magnetic field like the conventional inductive head for recording and reproduction. FIG. 1 is a fragmentary cross sectional elevation view illustrative of an inductive head of the conventional magnetoresistance effect composite head. The inductive head of the conventional magnetoresistance effect composite head comprises first and second magnetic poles 80 and 84, a magnetic gap layer 82 on the second magnetic pole 84 and provided between the first and second magnetic poles 80 and 84, and a third magnetic pole 86 sandwiched between the magnetic gap layer 82 and the first magnetic pole 80. The magnetic field is generated between the second and third magnetic poles 84 and 86 through the magnetic gap layer 82, without any substantive leakage of the magnetic field. As a result, the side fringe magnetic field is well suppressed.

The above conventional inductive head in the magnetoresistance effect composite head is formed as follows. FIGS. 2A through 2D are fragmentary cross sectional elevation views illustrative of the conventional inductive head in the magnetoresistance effect composite head in sequential steps involved in a fabrication method.

With reference to FIG. 2A, a non-magnetic layer 82' is formed on a first magnetic layer 80' acting as a magnetic shielding layer in the magnetoresistance effect head. Frames 88a and 88b are selectively formed on the non-magnetic layer 82'. The frames 88a and 88b comprise photoresist.

With reference to FIG. 2B, a second magnetic layer 84' is selectively formed between the frames 88a and 88b by a frame plating treatment. The width of the second magnetic layer 84' is defined by a gap between the frames 88a and 88b.

With reference to FIG. 2C, the used frames 88a and 88b are removed. An ion beam milling is carried out by use of the second magnetic layer 84' as a mask to selectively etch the non-magnetic layer 82' and the first magnetic layer 80'. The first magnetic layer 80' is etched at a predetermined depth whereby the second and third magnetic poles 84 and 86 and the magnetic gap layer 82 are formed. The incident angle of the ion beam is optimally adjusted to form vertical walls of the laminated structure of the second and third magnetic poles 84 and 86 and the magnetic gap layer 82 as illustrated in FIG. 2D. The magnetic field is substantially defined between the second and third magnetic poles 84 and 86 through the magnetic gap layer. The side fringe magnetic field is well suppressed.

The ion beam milling etches not only the first magnetic layer 80' but also the second magnetic layer 84' acting as the mask. The thickness of the second magnetic layer 84' is largely reduced by the ion beam milling. The formation of the third magnetic pole 86 by the ion beam milling results in reduction in thickness of the second magnetic pole 84. For those reasons, it is required that the second magnetic layer 84' is thicker than the second magnetic pole 84 by the etching depth of the second magnetic layer 84'. This means that the frames 88a and 88b defining the second magnetic layer 84' is required to be equal to or higher than the thickness of the second magnetic layer 84'. This further means that the frames 88a and 88b comprising photoresists are required to be much higher than the thickness of the second magnetic pole 84. The increase in height of the frames 88a and 88b comprising photoresists makes it difficult to reduce the distance between the frames 88a and 88b. The minimum distance between the frames 88a and 88b is 2 micrometers. This means that the minimum width of the second and third magnetic poles 84 and 86 is 2 micrometers. The recording density is limited by the minimum width of the second and third magnetic poles 84 and 86. In order to further increase in the recording density, it is required to further reduce the minimum width of the second and third magnetic poles 84 and 96. This requirement for reduction in the minimum width of the second and third magnetic poles 84 and 96 further needs the reduction in height of the frames 88a and 88b.

In the above circumstances, it had been required to develop a novel inductive head structure in the magnetoresistance effect composite head with a further reduced track width and capable of a further increased recording density.

SUMMARY OF THE INVENTION

Accordingly, it is an object of the present invention to provide a novel inductive head structure in the magnetoresistance effect composite head free from the above problems and disadvantages.

It is a further object of the present invention to provide a novel inductive head structure in the magnetoresistance effect composite head with a further reduced track width.

It is a still further object of the present invention to provide a novel inductive head structure in the magnetoresistance effect composite head capable of a further increased recording density.

It is yet a further object of the present invention to provide a novel inductive head structure in the magnetoresistance effect composite head, which has a further reduced width of magnetic poles between which magnetic field is substantially confined.

It is another object of the present invention to provide a novel method of forming a novel inductive head structure in the magnetoresistance effect composite head free from the above problems and disadvantages.

It is further another object of the present invention to provide a novel method of forming a novel inductive head structure in the magnetoresistance effect composite head with a further reduced track width.

It is still another object of the present invention to provide a novel method of forming a novel inductive head structure in the magnetoresistance effect composite head capable of a further increased recording density.

It is yet another object of the present invention to provide a novel method of forming a novel inductive head structure in the magnetoresistance effect composite head, which has a further reduced width of magnetic poles between which magnetic field is substantially confined.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

The magnetic gap layer 82 comprises the non-magnetic layer 82' and is formed by the ion beam milling to the non-magnetic layer 82'. Since, however, the non-magnetic layer 82' is normally made of alumina which has a lower milling rate than the first and second magnetic layers 80' and 84'. This means that it takes a long milling time to selectively remove the non-magnetic layer 82'. This results in a large etching depth of the second magnetic layer 84'.

The present invention was achieved by eliminating the milling process for selective removal of the non-magnetic layer 82' resulting in a small etching depth of the second magnetic layer 84'. This allows a reduction in thickness of the second magnetic layer 84', resulting in a reduction in height of the frames 88a and 88b. This allows a reduction in distance between the frames 88a and 88b, resulting in a reduction in width of the second and third magnetic poles 86 and 84. This allows a reduction in width of the track, whereby the recording density is increased.

In accordance with the present invention, the non-magnetic layer 82' acting as the magnetic gap layer 82 is selectively removed by a reactive ion etching which selectively etches the non-magnetic layer 82' and does not etch the second magnetic layer 84'. The non-magnetic layer 82' acting as the magnetic gap layer 82 is made of a non-magnetic and electrical insulation material which has a higher etching rate to the reactive ion etching than the second magnetic layer 84'. The non-magnetic layer 82' acting as the magnetic gap layer 82 used in the present invention is made of a different material from alumina and may be made of, for example, silicon dioxide. If the second magnetic layer 84' is made of NiFe alloys, the magnetic gap layer 82 may be made of $SiO_2$. The reactive ion etching may be carried out by use of $CF_4$ gas which selectively etches $SiO_2$. This method is applicable to the case where the magnetic material with a large saturated magnetization is provided adjacent to the magnetic gap layer. The minimum width of the second pole 84 is reduced to about 1 micrometer by eliminating the milling process for selectively removal of the non-magnetic layer 82'. This results in a small etching depth of the second magnetic layer 84'. This allows a reduction in thickness of the second magnetic layer 84', resulting in a reduction in height of the frames 88a and 88b. This allows a reduction in distance between the frames 88a and 88b, resulting in a reduction in width of the second and third magnetic poles 86 and 84. This allows a reduction in width of the track, whereby the recording density is increased.

PREFERRED EMBODIMENTS

First Embodiment

Figure 1:
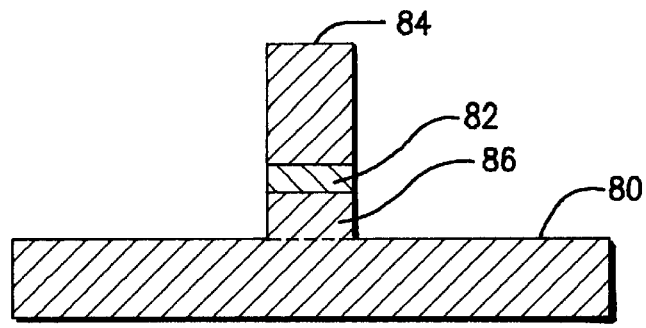
FIG. 1 is a fragmentary cross sectional elevation view illustrative of an inductive head of the conventional magnetoresistance effect composite head.
Figure 2A:
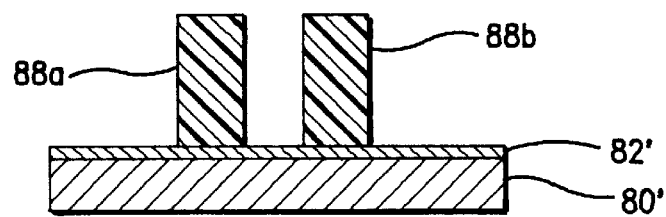
FIGS. 2A through 2D are fragmentary cross sectional elevation views illustrative of the conventional inductive head in the magnetoresistance effect composite head in sequential steps involved in a fabrication method.
Figure 2B:
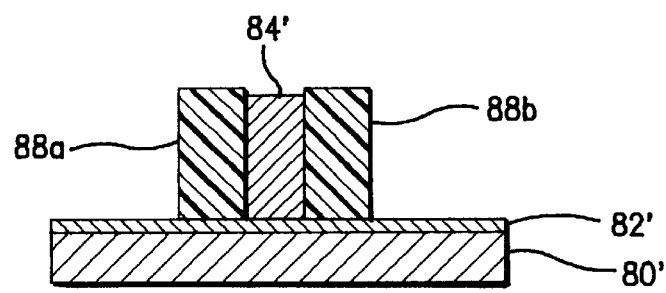
Figure 2C:
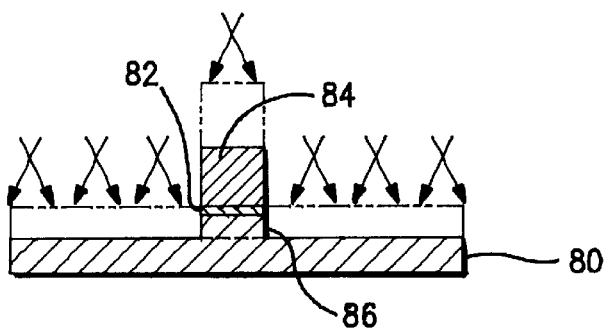
Figure 2D:
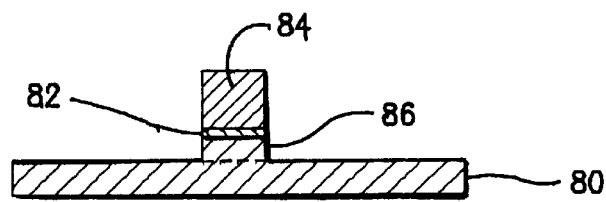
Figure 3:
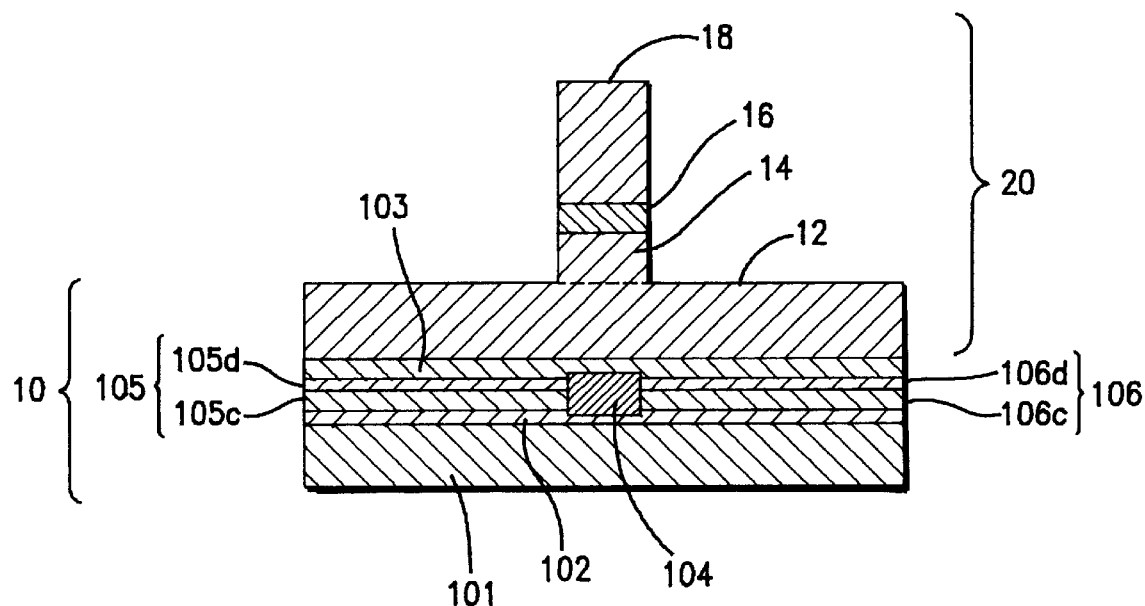
FIG. 3 is a fragmentary cross sectional elevation view illustrative of a novel magnetoresistance effect composite head with an improved inductive head structure in a first embodiment according to the present invention.

A first embodiment according to the present invention will be described in detail with reference to FIG. 3. A novel magnetoresistance effect composite head comprises a magnetoresistance effect head 10 and an improved inductive head 20. The inductive head comprises a first magnetic pole 12, a second magnetic pole 18, a magnetic gap layer 16 provided on the second magnetic pole 18 and provided between the first and second magnetic poles 12 and 18 and a third magnetic pole 14 sandwiched between the magnetic gap layer 16 and the first magnetic pole 12. The sandwiched structure of the magnetic gap layer 16 sandwiched by the second and third magnetic poles 18 and 14 are the mesa structure with vertical side walls over the first magnetic pole 12. The second and third magnetic poles 18 and 14 are the same as each other in width. The magnetic field is confined between the second and third magnetic poles 18 and 14. Almost no side fringe magnetic field is caused. The magnetic gap layer is made of a non-magnetic and electrically insulative material which, however, has a larger etching rate to reactive ion etching than an etching rate of a magnetic material of the second magnetic pole 18. The magnetic gap layer may be made of, for example, silicon dioxide. This magnetic gap layer provides the advantages to be described below.

The mesa structure is aligned to a center region of the magnetoresistance effect head. The second and third magnetic poles 18 and 14 are made of NiFe and have the same width of 1.1 micrometers and have thicknesses of 3.5 micrometers and 0.5 micrometers respectively. The magnetic gap layer 16 has a thickness of 0.25 micrometers. Cu coils are formed at a depth of 2 micrometers from the air-bearing surface. The Cu coils are isolated by a photoresist material. A current is applied to the Cu coils to generate the recording magnetic field across the magnetic gap layer 16.

On the other hand, the magnetoresistance effect head 10 comprises the above first magnetic pole 12 acting as a magnetic shielding layer, an opposite magnetic shielding layer 101, alumina films 102 and 103, a center region 104 and side regions 105 and 106. The first pole 12 and the opposite magnetic shielding layer 101 are made of NiFe alloys (permalloy). The first pole 12 has a thickness of 3 micrometers and the opposite magnetic shielding layer 101 has a thickness of 2 micrometers. Between the first pole 12 and the opposite magnetic shielding layer 101, the center region 104 sensitive to magnetic and the side regions 105 and 106 applying a current and a vertical bias magnetic field to the center region 104. The center region 104 comprises laminations of a NiFe film of 10 nanometers in thickness and having magnetoresistance effect, a CoZrMo film of 15 nanometers in thickness for applying a lateral bias magnetic field to the NiFe film, and a Ta film of 7 nanometers in thickness which isolates the NiFe film from the CoZrMo film. The Ta film is laminated on the CoZrMo film and the NiFe film is laminated on the Ta film. The width of the center region 104 is 0.8 micrometers. The side regions 105 and 106 are electrically connected with the center region 104. The side regions 105 and 106 comprise CoPtCr films 105c and 106c applying a vertical bias magnetic field to the NiFe film in the center region 104, and Au films 105d and 106d applying a current to the center region 104. The CoPtCr films 105c and 106c have a thickness of 25 nanometers. The magnetoresistance effect element comprises the center region 104 and the side regions 105 and 106. The magnetoresistance effect element is isolated by the alumina films 102 and 103. The alumina film 103 has a thickness of 90 nanometers and the alumina film 102 has a thickness of 65 nanometers.

The above improved inductive head in the magnetoresistance effect composite head is formed as follows.

Figure 4A:
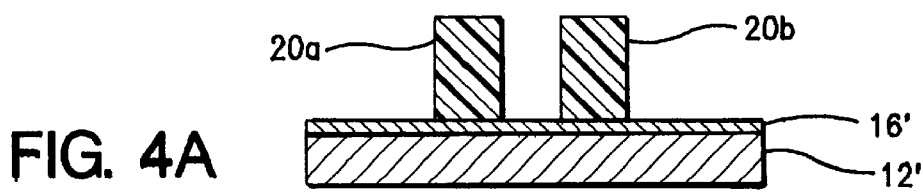
FIGS. 4A through 4E are fragmentary cross sectional elevation views illustrative of a novel magnetoresistance effect composite head with an improved inductive head structure in sequential steps involved in a fabrication method in a first embodiment according to the present invention.

With reference to FIG. 4A, a silicon dioxide magnetic gap layer 16' is deposited by sputtering method on a NiFe magnetic layer 12'. Frames 20a and 20b of photoresist are selectively formed on the magnetic gap layer 16' for frame plating treatment. Cu coils are formed in a depth of about 2 micrometers from the air-bearing surface where the Cu coils are isolated by the photoresist.

Figure 4B:
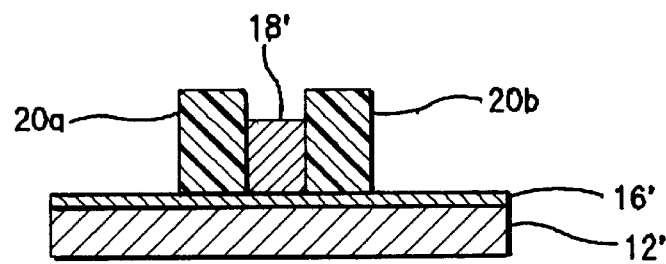

With reference to FIG. 4B, the NiFe layer 18' is formed between the frames 20a and 20b by frame plating treatment. The width of the NiFe layer 18' is defined by the distance of the frames 20a and 20b.

Figure 4C:
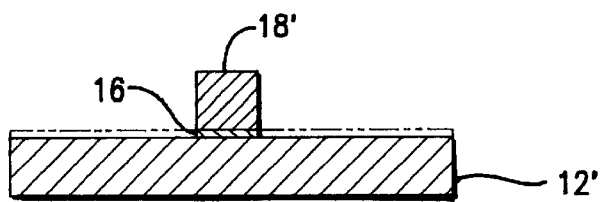

With reference to FIG. 4C, the used frames 20a and 20b are removed. A reactive ion etching is carried out by use of $CF_4$ gas, where the NiFe layer 18' serves as a mask. Since the silicon dioxide magnetic gap layer 16' has a much larger etching rate to the $CF_4$ gas than the NiFe layer 18', the silicon dioxide magnetic gap layer 16' is selectively removed. In the reactive ion etching, $CF_4$ gas flow rate is 30 sccm, and a vacuum pressure of the etching chamber is 6 Pa. A high frequency plasma output is 100 W and a direct-current bias voltage is 500 V. The etching rate of the silicon dioxide magnetic gap layer 16' is 35 nm/min, whilst the etching rate of the NiFe layer 18' is 1 nm/min. The etching depth of the NiFe layer 18' is only 7 nanometers.

Figure 4D:
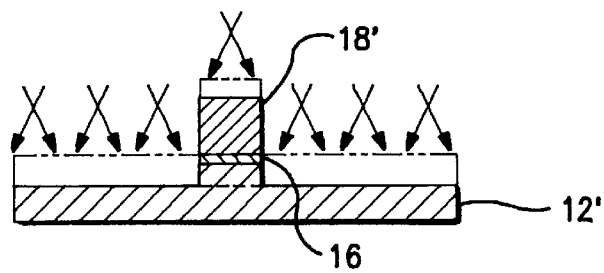
Figure 4E:
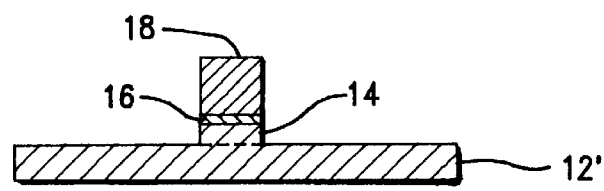

With reference to FIG. 4D, the ion beam milling is carried out by use of the NiFe layer 18' as a mask to selectively remove the NiFe layer 12' to form the third magnetic pole 14. At this time, the NiFe layer 18' is also etched. The second magnetic pole 18 is also shaped which has the same width as the third magnetic pole 14 as illustrated in FIG. 4E. The incident angle of the ion beam is 30 degrees to form the side walls of the third magnetic pole 14 before the incident angle is changed to 70 degrees to remove materials adhered on the side walls of the second magnetic pole 18. The height of the side walls of the third magnetic pole 14 is 500 nanometers. The second magnetic pole 18 is etched by 1 micrometers so that the final thickness of the second magnetic pole 18 is 3.5 micrometers. In order to obtain the second magnetic pole 18 of 3.5 micrometers in thickness, it is required that the magnetic layer 18' has a thickness of 4.5 micrometers. The frames 20a and 20b are required to have the height of 6 micrometers, for which reason it is possible to make the distance of the frames 20a and 20b narrow at about 1.1 micrometers.

Second Embodiment

Figure 5:
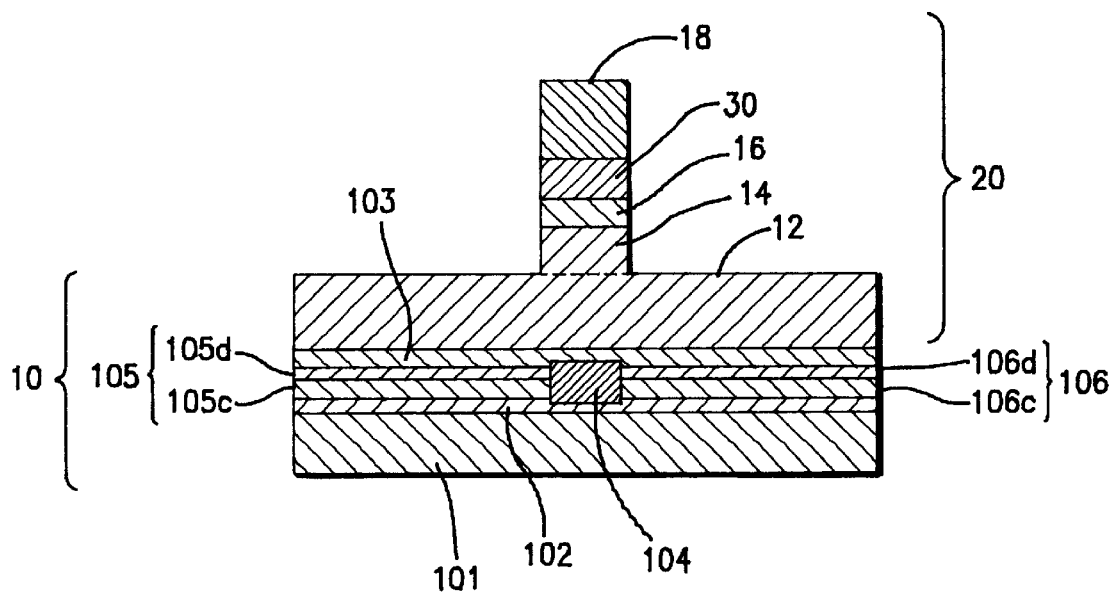
FIG. 5 is a fragmentary cross sectional elevation view illustrative of a novel magnetoresistance effect composite head with an improved inductive head structure in a second embodiment according to the present invention.

A second embodiment according to the present invention will be described in detail with reference to FIG. 5. A novel magnetoresistance effect composite head comprises a magnetoresistance effect head 10 and an improved inductive head 20. The inductive head comprises a first magnetic pole 12, a second magnetic pole 18, a magnetic gap layer 16 provided between the first and second magnetic poles 12 and 18, a third magnetic pole 14 sandwiched between the magnetic gap layer 16 and the first magnetic pole 12 and a fourth magnetic pole 30 sandwiched between the magnetic gap layer 16 and the second magnetic pole 18. The sandwiched structure of the magnetic gap layer 16 sandwiched by the second, third and fourth magnetic poles 18, 14 and 30 are the mesa structure with vertical side walls over the first magnetic pole 12. The fourth magnetic pole 30 has a larger saturated magnetization than the second magnetic pole 18. The second, third and fourth magnetic poles 18, 14 and 30 are the same as each other in width. The magnetic field is confined between the third and fourth magnetic poles 14 and 30. Almost no side fringe magnetic field is caused. The magnetic gap layer is made of a non-magnetic and electrically insulative material which, however, has a larger etching rate to reactive ion etching than an etching rate of a magnetic material of the second magnetic pole 18. The magnetic gap layer may be made of, for examples silicon dioxide. This magnetic gap layer provides the advantages to be described below.

The mesa structure is aligned to a center region of the magnetoresistance effect head. The second and third magnetic poles 18 and 14 are made of NiFe and have the same width of 1.1 micrometers and have thicknesses of 1.1 micrometers and 0.5 micrometers respectively. The magnetic gap layer 16 has a thickness of 0.25 micrometers. The fourth magnetic pole 30 is made of CoTaZr and has a thickness of 0.5 micrometers. The fourth magnetic pole 30 also has a saturated magnetization of 15 KG and a resistivity of 100 micro-ohms cm. Cu coils are formed at a depth of 2 micrometers from the air-bearing surface. The Cu coils are isolated by a photo-resist material. A current is applied to the Cu coils to generate the recording magnetic field across the magnetic gap layer 16.

On the other hand, the magnetoresistance effect head 10 comprises the above first magnetic pole 12 acting as a magnetic shielding layer, an opposite magnetic shielding layer 101, alumina films 102 and 103, a center region 104 and side regions 105 and 106. The first pole 12 and the opposite magnetic shielding layer 101 are made of NiFe alloys (permalloy). The fist pole 12 has a thickness of 3 micrometers and the opposite magnetic shielding layer 101 has a thickness of 2 micrometers. Between the first pole 12 and the opposite magnetic shielding layer 101, the center region 104 sensitive to magnetic and the side regions 105 and 106 applying a current and a vertical bias magnetic field to the center region 104. The center region 104 comprises laminations of a NiFe film of 10 nanometers in thickness and having magnetoresistance effect, a CoZrMo film of 15 nanometers in thickness for applying a lateral bias magnetic field to the NiFe film, and a Ta film of 7 nanometers in thickness which isolates the NiFe film from the CoZrMo film. The Ta film is laminated on the CoZrMo film and the NiFe film is laminated on the Ta film. The width of the center region 104 is 0.8 micrometers. The side regions 105 and 106 are electrically connected with the center region 104. The side regions 105 and 106 comprise CoPtCr films 105c and 106c applying a vertical bias magnetic field to the NiFe film in the center region 104, and Au films 105d and 106d applying a current to the center region 104. The CoPtCr films 105c and 106c have a thickness of 25 nanometers. The magnetoresistance effect element comprises the center region 104 and the side regions 105 and 106. The magnetoresistance effect element is isolated by the alumina films 102 and 103. The alumina film 103 has a thickness of 90 nanometers and the alumina film 102 has a thickness of 65 nanometers.

The above improved inductive head in the magnetoresistance effect composite head is formed as follows.

Figure 6A:
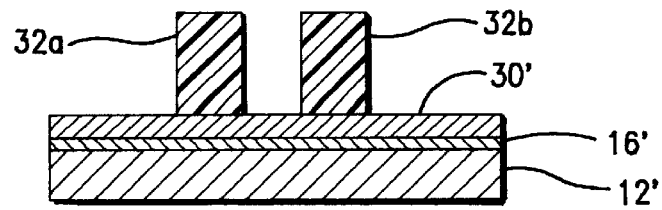
FIGS. 6A through 6F are fragmentary cross sectional elevation views illustrative of a novel magnetoresistance effect composite head with an improved inductive head structure in sequential steps involved in a fabrication method in a second embodiment according to the present invention.

With reference to FIG. 6A, a silicon dioxide magnetic gap layer 16' is deposited by sputtering method on a NiFe magnetic layer 12'. A CoTaZr layer 30' of 0.5 micrometers in thickness is deposited by sputtering method on the silicon dioxide magnetic gap layer 16'. Frames 20a and 20b of photoresist are selectively formed on the CoTaZr layer 30' for frame plating treatment. Cu coils are formed in a depth of about 2 micrometers from the air-bearing surface where the Cu coils are isolated by the photoresist.

Figure 6B:
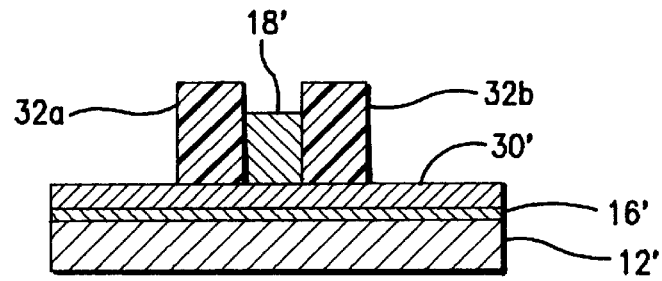

With reference to FIG. 6B, the NiFe layer 18' is formed between the frames 20a and 20b by frame plating treatment. The width of the NiFe layer 18' is defined by the distance of the frames 20a and 20b.

Figure 6C:
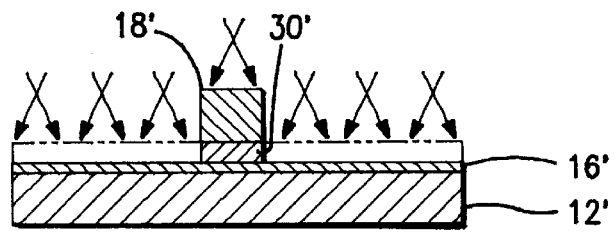

With reference to FIG. 6C, the used frames 20a and 20b are removed. An ion beam milling is carried out by use of the NiFe layer 18' as a mask to selectively remove the CoTaZr layer 30' to form the fourth magnetic pole 30 which has the same width as the NiFe layer 18'. The incident angle of the ion beam is 30 degrees to form the side walls of the fourth magnetic pole 30 before the incident angle is changed to 70 degrees to remove materials adhered on the side walls of the fourth magnetic pole 30. For removing the CoTaZr layer 30', the thickness of the NiFe layer 18' is reduced by 1 micrometer.

Figure 6D:
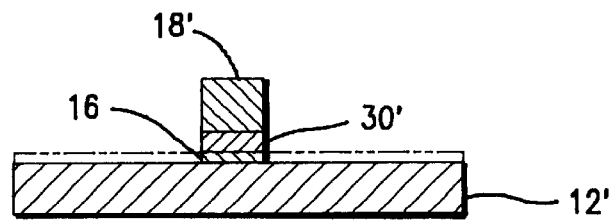

With reference to FIG. 6D, a reactive ion etching is carried out by use of $CF_4$ gas, where the NiFe layer 18' serves as a mask. Since the silicon dioxide magnetic gap layer 16' has a much larger etching rate to the $CF_4$ gas than the NiFe layer 18', the silicon dioxide magnetic gap layer 16' is selectively removed. In the reactive ion etching, $CF_4$ gas flow rate is 30 sccm, and a vacuum pressure of the etching chamber is 6 Pa. A high frequency plasma output is 100 W and a direct-current bias voltage is 500 V. The etching rate of the silicon dioxide magnetic gap layer 16' is 35 nm/min., whilst the etching rate of the NiFe layer 18' is 1 nm/min. The etching depth of the NiFe layer 18' is only 7 nanometers.

Figure 6E:
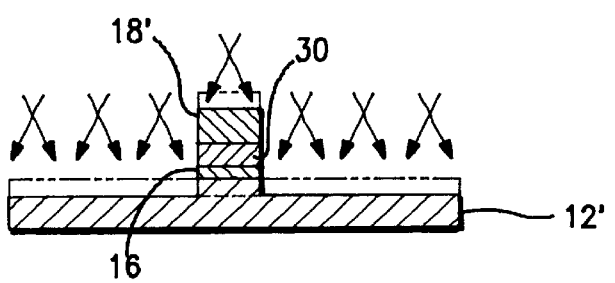
Figure 6F:
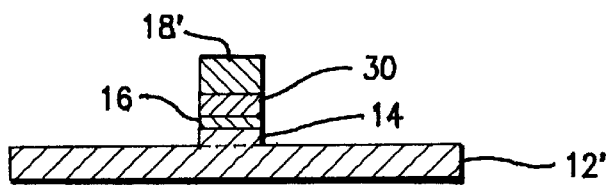

With reference to FIG. 6E, the ion beam milling is carried out by use of the NiFe layer 18' as a mask to selectively remove the NiFe layer 12' to form the third magnetic pole 14. At this time, the NiFe layer 18' is also etched. The second magnetic pole 18 is also shaped which has the same width as tie third magnetic pole 14 as illustrated in FIG. 6F. The incident angle of the ion beam is 30 degrees to form the side walls of the third magnetic pole 14 before the incident angle is changed to 70 degrees to remove materials adhered on the side walls of the second magnetic pole 18. The height of the side walls of the third magnetic pole 14 is 500 nanometers. The second magnetic pole 18 is etched by 1 micrometers so that the final thickness of the second magnetic pole 18 is 3.5 micrometers. In order to obtain the second magnetic pole 18 of 3.5 micrometers in thickness, it is required that the magnetic layer 18' has a thickness of 4.5 micrometers. The frames 20a and 20b are required to have the height of 6 micrometers, for which reason it is possible to make the distance of the frames 20a and 20b narrow at about 1.1 micrometers.

Third Embodiment

Figure 7:
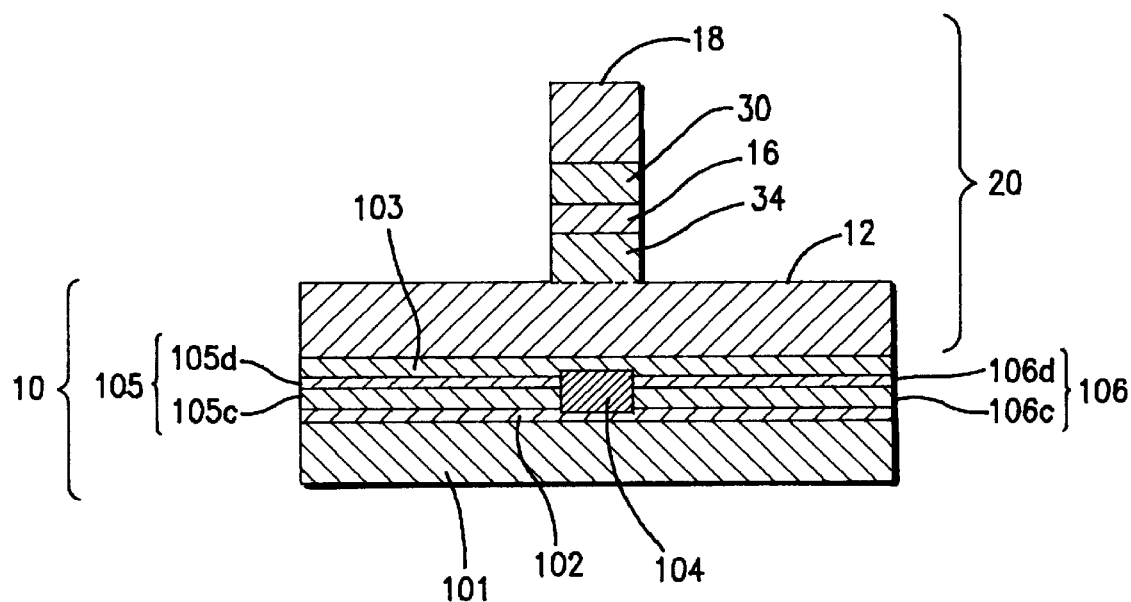
FIG. 7 is a fragmentary cross sectional elevation view illustrative of a novel magnetoresistance effect composite head with an improved inductive head structure in a third embodiment according to the present invention.

A third embodiment according to the present invention will be described in detail with reference to FIG. 7. A novel magnetoresistance effect composite head comprises a magnetoresistance effect head 10 and an improved inductive head 20. The inductive head comprises a first magnetic pole 12, a second magnetic pole 18, a magnetic gap layer 16 provided between the first and second magnetic poles 12 and 18, a third magnetic pole 34 sandwiched between the magnetic gap layer 16 and the first magnetic pole 12 and a fourth magnetic pole 30 sandwiched between the magnetic gap layer 16 and the second magnetic pole 18. The sandwiched structure of the magnetic gap layer 16 sandwiched by the second, third and fourth magnetic poles 18, 34 and 30 are the mesa structure with vertical side walls over the first magnetic pole 12. The fourth magnetic pole 30 has a larger saturated magnetization than the second magnetic pole 18. The second, third and fourth magnetic poles 18, 34 and 30 are the same as each other in width. The magnetic field is confined between the third and fourth magnetic poles 34 and 30. Almost no side fringe magnetic field is caused. The magnetic gap layer is made of a non-magnetic and electrically insulative material which, however, has a larger etching rate to reactive ion etching than an etching rate of a magnetic material of the second magnetic pole 18. The magnetic gap layer may be made of, for example, silicon dioxide. This magnetic gap layer provides the advantages to be described below.

The mesa structure is aligned to a center region of the magnetoresistance effect head. The second and third magnetic poles 18 and 34 are made of NiFe and CoTaZr respectively and have the same width of 1.1 micrometers and have thicknesses of 1.1 micrometers and 0.5 micrometers respectively. The magnetic gap layer 16 has a thickness of 0.25 micrometers. The fourth magnetic pole 30 is made of CoTaZr and has a thickness of 0.5 micrometers. The fourth magnetic pole 30 also has a saturated magnetization of 15 KG and a resistivity of 100 micro-ohms cm. Cu coils are formed at a depth of 2 micrometers from the air-bearing surface. The Cu coils are isolated by a photo-resist material. A current is applied to the Cu coils to generate the recording magnetic field across the magnetic gap layer 16.

On the other hand, the magnetoresistance effect head 10 comprises the above first magnetic pole 12 acting as a magnetic shielding layer, an opposite magnetic shielding layer 101, alumina films 102 and 103, a center region 104 and side regions 105 and 106. The first pole 12 and the opposite magnetic shielding layer 101 are made of NiFe alloys (permalloy). The first pole 12 has a thickness of 3 micrometers and the opposite magnetic shielding layer 101 has a thickness of 2 micrometers. Between the first pole 12 and the opposite magnetic shielding layer 101; the center region 104 sensitive to magnetic and the side regions 105 and 106 applying a current and a vertical bias magnetic field to the center region 104. The center region 104 comprises laminations of a NiFe film of 10 nanometers in thickness and having magnetoresistance effect, a CoZrMo film of 15 nanometers in thickness for applying a lateral bias magnetic field to the NiFe film, and a Ta film of 7 nanometers in thickness which isolates the NiFe film from the CoZrMo film. The Ta film is laminated on the CoZrMo film and the NiFe film is laminated on the Ta film. The width of the center region 104 is 0.8 micrometers. The side regions 105 and 106 are electrically connected with the center region 104. The side regions 105 and 106 comprise CoPtCr films 105c and 106c applying a vertical bias magnetic field to the NiFe film in the center region 104, and Au films 105d and 106d applying a current to the center region 104 The CoPtCr films 105c and 106c have a thickness of 25 nanometers. The magnetoresistance effect element comprises the center region 104 and the side regions 105 and 106. The magnetoresistance effect element is isolated by the alumina films 102 and 103. The alumina film 103 has a thickness of 90 nanometers and the alumina film 102 has a thickness of 65 nanometers.

The above improved inductive head in the magnetoresistance effect composite head is formed as follows.

Figure 8A:
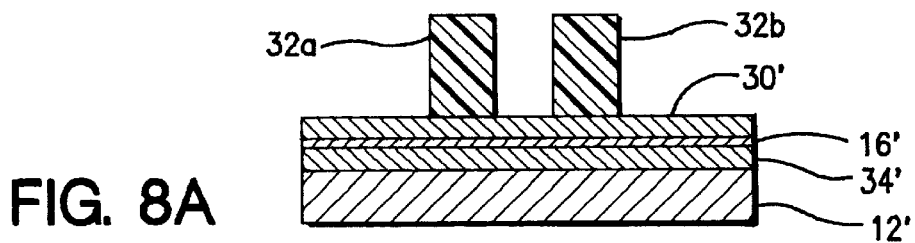
FIGS. 8A through 8F are fragmentary cross sectional elevation views illustrative of a novel magnetoresistance effect composite head with an improved inductive head structure in sequential steps involved in a fabrication method in a third embodiment according to the present invention.

With reference to FIG. 8A, a CoTaZr film 34' is deposited by sputtering method on NiFe magnetic layer 12'. A silicon dioxide magnetic gap layer 16' is deposited by sputtering method on the CoTaZr film 34'. A CoTaZr layer 30' of 0.5 micrometers in thickness is deposited by sputtering method on the silicon dioxide magnetic gap layer 16'. Frames 20a and 20b of photoresist are selectively formed on the CoTaZr layer 30' for frame plating treatment. Cu coils are formed in a depth of about 2 micrometers from the air-bearing surface where the Cu coils are isolated by the photoresist.

Figure 8B:
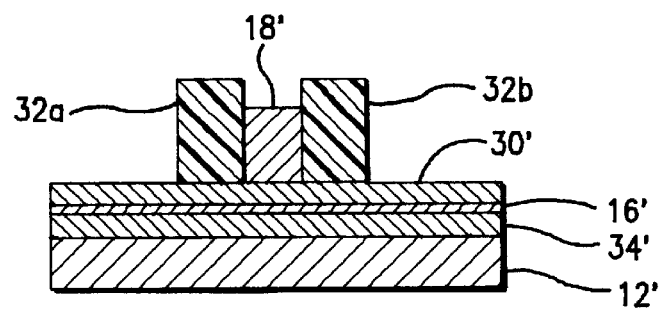

With reference to FIG. 8B, the NiFe layer 18' is formed between the frames 20a and 20b by frame plating treatment. The width of the NiFe layer 18' is defined by the distance of the frames 20a and 20b.

Figure 8C:
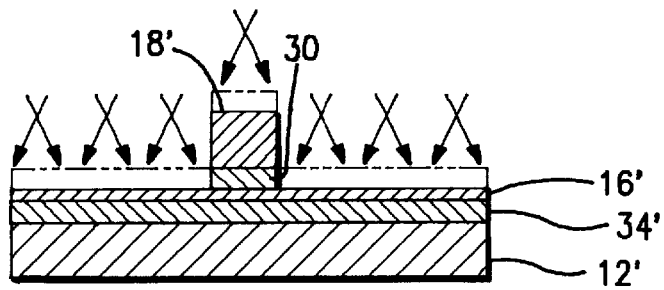

With reference to FIG. 8C, the used frames 20a and 20b are removed. An ion beam milling is carried out by use of the NiFe layer 18' as a mask to selectively remove the CoTaZr layer 30' to form the fourth magnetic pole 30 which has the same width as the NiFe layer 18'. The incident angle of the ion beam is 30 degrees to form the side walls of the fourth magnetic pole 30 before the incident angle is changed to 70 degrees to remove materials adhered on the side walls of the fourth magnetic pole 30. For removing the CoTaZr layer 30', the thickness of the NiFe layer 18' is reduced by 1 micrometer.

Figure 8D:
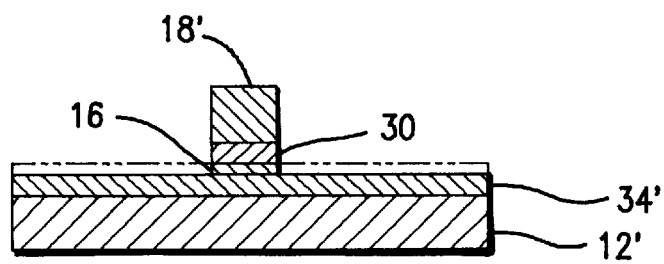

With reference to FIG. 8D, a reactive ion etching is carried out by use of $CF_4$ gas, where the Nile layer 18' serves as a mask. Since the silicon dioxide magnetic gap layer 16' has a much larger etching rate to the $CF_4$ gas than the NiFe layer 18', the silicon dioxide magnetic gap layer 16' is selectively removed. In the reactive ion etching, $CF_4$ gas flow rate is 30 sccm, and a vacuum pressure of the etching chamber is 6 Pa. A high frequency plasma output is 100 W and a direct-current bias voltage is 500 V. The etching rate of the silicon dioxide magnetic gap layer 16' is 35 nm/min., whilst the etching rate of the NiFe layer 18' is 1 nm/min. The etching depth of the NiFe layer 18' is only 7 nanometers.

Figure 8E:
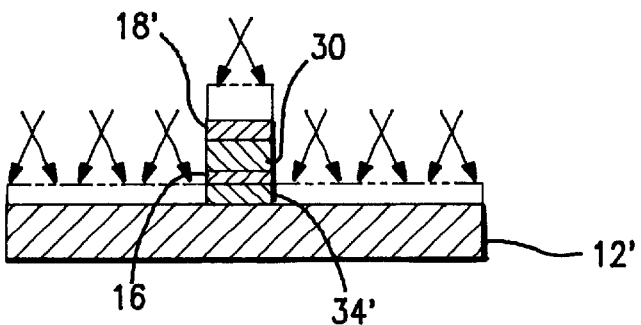
Figure 8F:
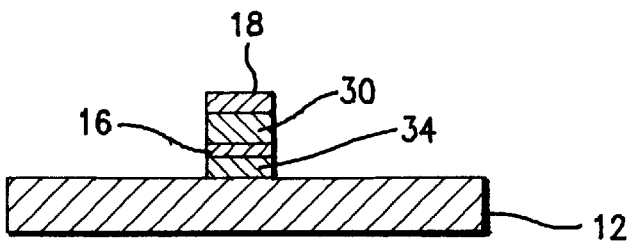

With reference to FIG. 8E, the ion beam milling is carried out by use of the NiFe layer 18' as a mask to selectively remove the CoTaZr layer 34' to form the third magnetic pole 34. At this time, the NiFe layer 18' is also etched. The second magnetic pole 18 is also shaped which has the same width as the third magnetic pole 34 as illustrated in FIG. 8F. The incident angle of the ion beam is 30 degrees to form the side walls of the third magnetic pole 34 before the incident angle is changed to 70 degrees to remove materials adhered on the side walls of the second magnetic pole 18. The height of the side walls of the third magnetic pole 34 is 500 nanometers. The second magnetic pole 18 is etched by 1 micrometers so that the final thickness of the second magnetic pole 18 is 3.5 micrometers. In order to obtain the second magnetic pole 18 of 3.5 micrometers in thickness, it is required that the magnetic layer 18' has a thickness of 4.5 micrometers. The frames 20a and 20b are required to have the height of 6 micrometers, for which reason it is possible to make the distance of the frames 20a and 20b narrow at about 1.1 micrometers.

It is possible to insert a high Bs film adjacent to the magnetic gap layer. The high Bs film may be made of, CoTaZr, FeN based magnetic materials, FeML based magnetic materials where M is one selected from the group consisting of Ta, Zr, Nb, Hf, Mo, Ti and L is one selected from the group consisting of N, C, B, O.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of defining a magnetic gap layer sandwiched by first and second magnetic layers acting as magnetic poles in an inductive head structure provided in a magnetoresistance effect composite head comprising an inductive head and a magnetoresistance effect head, comprising the steps of:

providing a magnetic gap layer intermediate a lower first magnetic layer and an upper defined width second magnetic layer, said magnetic gap layer being made of a non-magnetic and electrically insulative material which has a higher etching rate to reactive ion etching than said second magnetic layer; and subjecting said magnetic gap layer and said second magnetic layer on said magnetic gap layer to a reactive ion etching so that said magnetic gap layer is selectively removed.

2. The method as claimed in claim 1, wherein said non-magnetic and electrically insulative material is silicon dioxide.

3. The method as claimed in claim 1, wherein a width of said second magnetic layer is less than 2 micrometers.

4. The method as claimed in claim 3, wherein a width of said second magnetic layer is not more than 1.1 micrometers.

5. The method as claimed in claim 1, wherein said reactive ion etching uses a $CF_4$ gas.

6. A method of establishing a track width of an inductive head of a magnetoresistance effect composite head, comprising the steps of:

depositing a magnetic gap layer on a first magnetic layer;

providing a second magnetic layer of a defined width masking a portion of the magnetic gap layer;

reactive ion etching the second magnetic layer and the magnetic gap layer to selectively remove the magnetic gap layer not masked by the second magnetic layer, wherein the magnetic gap layer is a non-magnetic and electrically insulative material having a higher reactive ion etching rate than the second magnetic layer.

7. The method of claim 6, wherein the material used for the magnetic gap layer is silicon dioxide and the material used for the first magnetic layer is NiFe.

8. The method of claim 7, wherein the material used for the second magnetic layer is NiFe.

9. The method of claim 6, wherein the magnetic gap layer is selected to have a reactive ion etching rate at least thirty times greater than the second magnetic layer.

10. The method of claim 6, further comprising the step of:

subsequent to said reactive ion etching step, ion beam milling the second magnetic layer and the first magnetic layer to reduce a thickness of the first magnetic layer so as to form a magnetic pole of the first magnetic layer rising from the first magnetic layer.

11. The method of claim 6, wherein said step of depositing a magnetic gap layer on a first magnetic layer comprises the steps of depositing a first magnetic pole of a first material on the first magnetic layer, depositing a second magnetic pole of a second material different from the first material on the first magnetic pole, and depositing a third magnetic pole of a third material on the second magnetic pole.

12. The method of claim 11, wherein CoTaZr is used as the first material and third material, and silicon dioxide is used as the second material.

13. The method of claim 6, wherein said step of providing a second magnetic layer, provides a second magnetic layer with a width less than 2 micrometers.

14. The method of claim 6, wherein said step of providing a second magnetic layer, provides a second magnetic layer with a width less than 1.1 micrometers.

15. The method of claim 6, wherein said step of reactive ion etching the second magnetic layer and the magnetic gap layer to selectively removing the magnetic gap layer not masked by the second magnetic layer is performed using a $CF_4$ gas.

* * * * *